United States Patent [19]

Lechner

[11] Patent Number: 5,799,916
[45] Date of Patent: Sep. 1, 1998

[54] BRACKET FOR FLOATING DOCKS AND RAFTS

[76] Inventor: Donald A. Lechner, 51 S. County Trunk Y, Mayville (Kekoskee), Wis. 53050

[21] Appl. No.: 601,529

[22] Filed: Feb. 14, 1996

[51] Int. Cl.[6] .................................................. F16L 3/00
[52] U.S. Cl. ........................ 248/230.8; 248/219.4; 114/267; 441/46
[58] Field of Search .............................. 248/503, 230.8, 248/219.4, 154; 114/266, 267, 263; 441/46; 403/22, 43; 285/309, 310, 313, 366, 367, 410, 407

[56] References Cited

U.S. PATENT DOCUMENTS

| | | | |
|---|---|---|---|
| 1,700,153 | 1/1929 | Bradley | 114/263 |
| 1,871,475 | 8/1932 | Smith | 114/263 |
| 2,394,764 | 2/1946 | Greulich | 114/267 |
| 2,887,975 | 5/1959 | Smith | 114/263 |
| 2,984,076 | 5/1961 | Bradley | 114/263 X |
| 3,109,183 | 11/1963 | Overmyer | 441/46 |
| 3,446,172 | 5/1969 | Morton et al. | 114/267 |
| 3,857,352 | 12/1974 | Schott | 114/267 X |
| 4,148,456 | 4/1979 | Garchinsky | 248/230.9 X |
| 4,659,046 | 4/1987 | Parduhn | 248/219.4 X |
| 4,860,985 | 8/1989 | Olson et al. | 248/219.4 X |
| 4,926,399 | 5/1990 | Hickman | 248/230.9 X |
| 4,926,776 | 5/1990 | Corbett | 114/266 X |
| 5,056,452 | 10/1991 | McCain | 114/263 |
| 5,078,071 | 1/1992 | Miura | 114/263 |
| 5,098,051 | 3/1992 | Aldridge et al. | 248/229.17 X |

FOREIGN PATENT DOCUMENTS

| | | | |
|---|---|---|---|
| 326895 | 3/1930 | United Kingdom | 248/230.9 |
| 2021390 | 12/1979 | United Kingdom | 248/219.4 |

*Primary Examiner*—Derek J. Berger
*Assistant Examiner*—Donald J. Wallace
*Attorney, Agent, or Firm*—Ryan, Maki, Mann & Hohenfeldt

[57] ABSTRACT

A bracket for being mounted to a flotation device such as a drum is manufactured as a single piece which includes spaced apart parallel sidewalls having a curved bottom edge for mating with the curvature of the periphery of a floating drum and has end walls spanning between the sidewalls at opposite ends of the sidewalls and a top wall opposite of the lower curved edges of the sidewalls in which top wall there is a central opening on opposite sides of which there are flat load bearing surfaces. A clamping device having the properties of a turnbuckle connects between the ends of strap which wraps around the drum and hooks to opposite ends of the turnbuckle so that turning of the body of the turnbuckle holds the ends of the strap together to effect frictional gripping of the bracket to the drum.

3 Claims, 2 Drawing Sheets

BRACKET FOR FLOATING DOCKS AND RAFTS

BACKGROUND OF THE INVENTION

The invention disclosed herein pertains to a bracket and floatable docks and rafts in which the bracket is utilized.

A variety of floating docks and rafts have been devised in the past wherein floatable members such as pontoons, barrels or drums provide buoyancy and means are provided for building a deck or platform on the floatable members. Prior dock and raft structures usually use an assortment of hardware to fasten the deck members to the floatable members which makes assembly of a dock or raft difficult for a do it yourself individual. Furthermore, the hardware heretofore available for making a dock is sufficiently expensive to discourage an individual from undertaking the project.

At the present time, many metal and plastic drums and barrels that have been emptied of their contents are accumulating because it is difficult and not cost effective to clean them sufficiently well to be recycled. It is difficult to recycle plastic and metal drums. Moreover, metal and plastic barrels and drums have such a large ratio of volume to recyclable material that it is not cost effective to ship them to a plant where they may be cleaned or melted down for recycling.

Putting discarded drums and barrels to good use in making rafts and floating docks could be encouraged if easy to use and inexpensive components are made available for constructing a deck on buoyant barrels and drums. For the sake of brevity, the word "drums" will be used herein as generic to barrels and pontoons as well as drums.

SUMMARY OF THE INVENTION

An objective of the invention disclosed herein is to provide a unique bracket which facilitates fabricating a deck on buoyant drums and reduces the level of skill that is required to build a raft or floating dock.

Another objective is to minimize the cost of the bracket and at the same time provide a market for recycled materials by way of manufacturing the bracket of recycled plastics.

How the foregoing and other more specific objectives and features of the invention are achieved and implemented will appear in the more detailed description of a preferred embodiment of the invention which will now be set forth in reference to the drawings.

DESCRIPTION OF A PREFERRED EMBODIMENT

Figure 1:
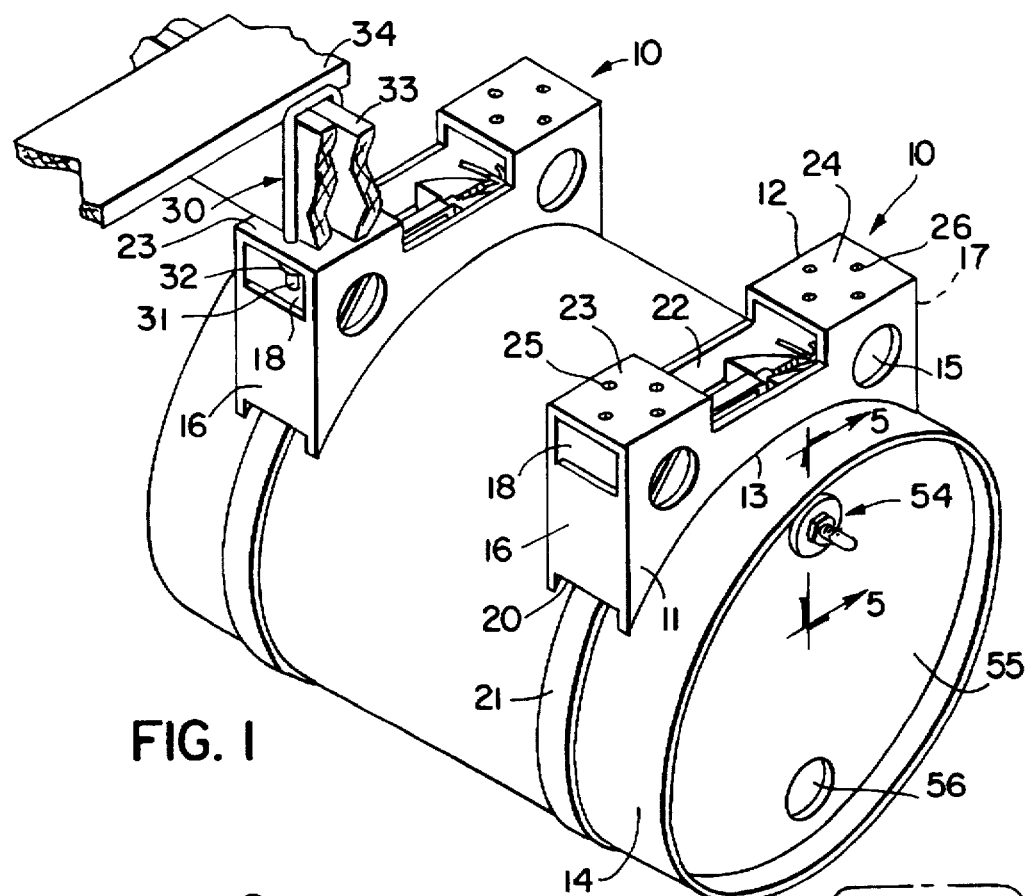
FIG. 1 is a perspective view of a flotation drum to which two of the new brackets are fastened and fragments, partly in section, of wooden beam and deck members are clamped.

Referring to FIG. 1, one of the new brackets is designated generally by the numeral 10. The bracket has parallel sidewalls 11 and 12. Both sidewalls have curved lower edges 13 which correspond in radius to the radius of cylindrical drum surface 14. The other parallel sidewall 12 also has a curved lower edge which is similar to edge 13 of sidewall 11. The sidewalls have lightener holes such as the one marked 15.

The sidewalls 11 and 12 have end walls 16 and 17 interconnecting the sidewalls and spanning across the space between the sidewalls. The end walls have rectangular holes 18 and 19 for accessing the interior of the bracket. As one may see most clearly in FIG. 1, the lower edge of typical end wall 16 has a notch 20 for allowing a strap 21 to pass through the end wall. The strap holds the bracket 10 to the periphery of cylindrical drum 14. The means for using strap 21 for clamping bracket 10 to the drum will be described in more detail later.

The top wall of bracket 10 has a cutaway or opening 22 which extends into the sidewalls and results in defining two flat load bearing surfaces 23 and 24 on opposite sides of central opening 22. Flat bearing surface 23 has four holes 25 and flat bearing surface 24 also has four holes 26. In FIG. 1, a U-bolt 30 has the threaded ends 31 of it legs extending through the top wall bearing surface 23 and by tightening nuts 32 the U-bolts clamp wooden beams 33, consisting of planks, to the bracket 10. Beams 33 extend longitudinally of drum 14 and can extend into the next coaxial or endwise drum, not shown, for tying drums in series to make a dock or raft of any desired length. Deck plates, constituting wooden planks 34 rest on and are preferably screwed onto beams 33 to provide for interconnecting laterally spaced apart drums together to form a deck or dock surface. As is evident in FIG. 2, the U-bolts 30 can be installed in either one of the pairs of holes 25 or 26 in the bearing surfaces 23 and 24, respectively. In the left illustration in FIG. 2, U-bolt 30 lies in a longitudinally extending vertical plane whereas the right U-bolt 30 is installed in the opposite pair of holes so as to lie in a transversely extending vertical plane where the axis of the drum is directed longitudinally.

Figure 2:
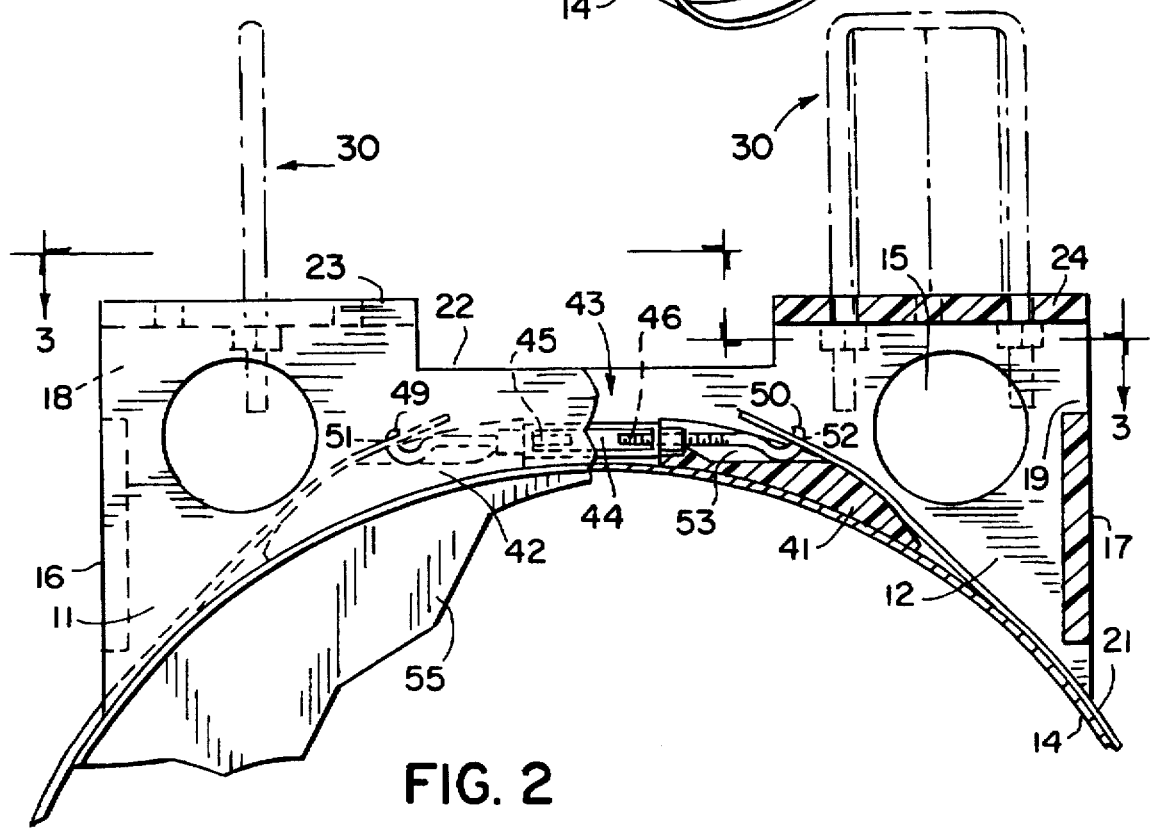
FIG. 2 is a vertical sectional view of a bracket for demonstrating how a bracket is fastened to a flotation drum and how U-bolts can be orientated alternatively in right angular directions to provide for deck planks extending laterally and/or longitudinally in a raft or dock structure.
Figure 3:
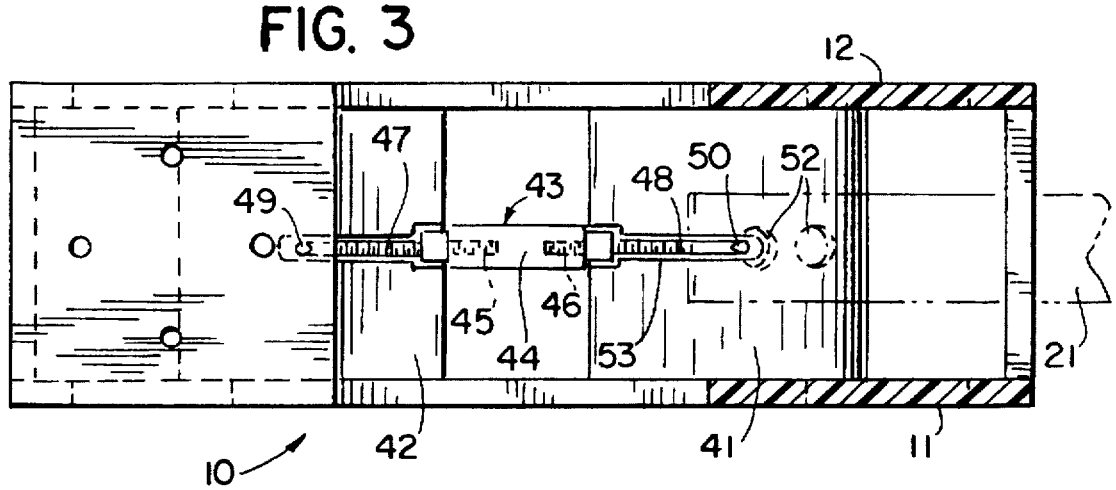
FIG. 3 is a top plan view of the new bracket with a part broken away to show the interior of the bracket, the section having been taken on the irregular line 3—3 in FIG. 2.

FIGS. 2 and 3 illustrate that there are two symmetrically arranged members 41 and 42 extending across the space between sidewalls 11 and 12 with their ends joining the sidewalls 11 and 12 unitarily since the entire bracket 10 is manufactured as a single piece of plastic. Members 40 and 41 have utility which will be explained shortly hereinafter.

Brackets 10 are secured to the periphery of the cylindrical drums 14 by means of straps 21. FIGS. 2 and 3 exhibit the device 43 which is used for tightening a strap 21 to a drum 14. Device 43 is similar to a conventional turnbuckle in that it has a hexagonal body 44 which has a left hand thread 45 in one end and a right hand thread 46 in the opposite end. Hooks having threaded shanks 47 and 48 screw into threaded holes 45 and 46, respectively of hexagonal body 44. The hook portions 49 and 50 which terminate the threaded shanks 47 and 48 hook into holes 51 and 52 in a series of holes which are provided in the opposite end portions of strap 14. The hooks 49 and 50 set in slots such as the one marked 53 in cross member 41. These slots prevent the hooks from rotating when the strap 21 is being tensioned by turning hexagon body 44. This body could have a square cross section. Tightening of the strap is accomplished by turning body member 44 in the appropriate direction for drawing the threaded ends of the hooks toward each other to thereby create tension in strap 21 and frictional gripping of the strap to the periphery of cylindrical drum 14.

Figure 5:
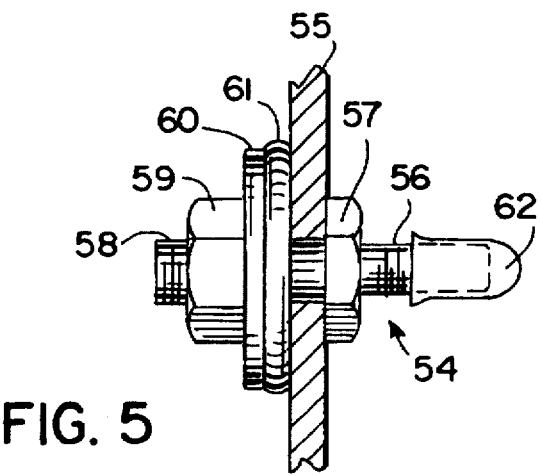
FIG. 5 is an enlargement of an air valve which is shown in FIG. 4.

As shown in FIG. 1, the circular ends 55 of all of the drums used to compose a dock or raft have one open bung hole 56 and another bung hole occupied by a valve assembly which is generally designated by the numeral 54. The valve assembly is similar to the type used in the stem, not shown, of a tubeless automobile tire. FIG. 5 shows a profile of the valve fastened to the end wall 55 of a drum. The valve stem has an external thread 56 which provides for using a lock nut 57 to secure the valve to one side of the end 55 of a drum. The other side of the valve has a thread 58 on which a nut 59 is tightened to create pressure on a metal ring 60 which bears on an annular pliable gasket 61. A protective cap 62 is fitted onto thread 56. As in the familiar case of the automobile tire, cap 62 is removed and a hose connector is pressed onto the end of threaded stem 56 to force air into the drum.

Figure 4:
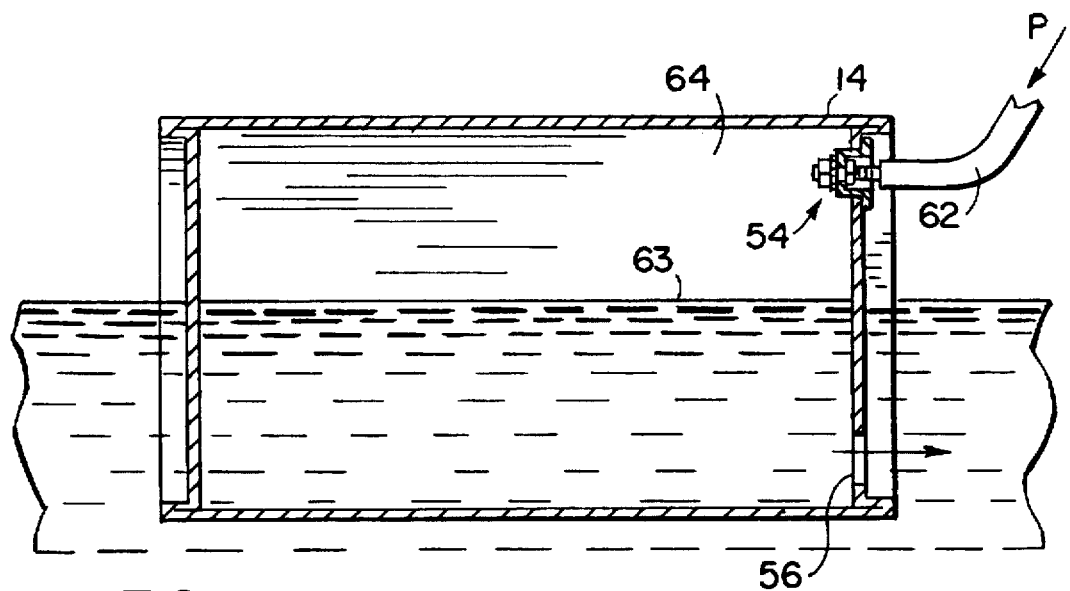
FIG. 4 is a vertical section of a flotation drum provided with a valve for changing the volume of the air trapped in the drum and thereby changing its buoyancy or floating level.

FIG. 4 shows an air hose 62 for delivering pressurized air through valve 54. By forcing air into cylindrical drum 15 through valve 54, water 63 in the drum can be forced out through bung hole 56 to change the buoyance effect of the drum. If one desires to have the drum, that is, the dock or raft built thereon, to settle deeper into the water, valve 54 is utilized to allow air to be removed from the free space 64 within the drum to be displaced by water flowing into the drum through bung hole 56.

Although a preferred embodiment of the invention has been described in detail, such description is intended to be illustrative rather than limiting, for the invention may be variously embodied and is to be limited only by interpretation of the claims which follow.

I claim:

1. A bracket for facilitating constructing a floating platform using cylindrical drums for buoyancy, said bracket comprising:

spaced apart side walls each having opposite ends, end walls and a top wall formed as a single piece, said side walls having lower edges that are curved for bearing on the periphery of one of said cylindrical drums, said end walls formed integrally with said side walls, said end walls spanning across the space between said side walls, said top wall formed integrally with said end walls and sidewalls and said top wall spanning across the space between said side walls, said end walls respectively having slots for passing through the slots the opposite end portions of a strap, for wrapping the strap about the periphery of the drum, said top wall having an opening for accessing the space between said side walls, portions of said top wall adjacent opposite sides of said opening constituting spaced apart load bearing surfaces, and strap support members, respectively, positioned in spaced apart relationship circumferentially of said curved lower edges of said side walls and symmetrically relative to said opening in said top wall, said support members spanning between said side walls and joined unitarily with said side walls, said support members each having a groove for receiving a respective hooked end of a turnbuckle so that the hooked end registers in the groove and is prevented from rotating when the turnbuckle is rotated to alter the distance between the hooks.

2. A bracket according to claim 1, further comprising:

said load bearing surfaces of said bracket having a plurality of pairs of through-holes, each surface adopted to support one or more wooden beams, and a plurality of U-shaped clamping bolts having opposite legs with threaded ends, the legs of each bolt passing through one said pair of holes in said surfaces, each bolt adapted to receive one of said beams disposed between the legs of said bolt, and nuts on said threaded ends to be tightened for clamping said beams to said load bearing surfaces, said through holes being arranged for receiving the U-shaped clamping bolts so that the legs of one bolt disposed in one pair of said holes are in a plane that is at a right angle relative to a plane defined by the legs of a bolt disposed in another of said pairs of through-holes.

3. A floating dock or raft using cylindrical drums for buoyancy, including:

at least on cylindrical drum, a bracket comprised of spaced apart side walls each having opposite ends, end walls and a top wall formed as a single piece, said side walls having lower edges that are curved for bearing on the periphery of a said cylindrical drum, said end walls formed integrally with said side walls, said end walls spanning across the space between said side walls, said top wall formed integrally with said end walls and sidewalls and said top, wall spanning across the space between said side walls, said end walls each having a slot for receiving through the slot an end portion of a strap adapted for wrapping about the periphery of said drum, said top wall having an opening for accessing the space between said side walls, portions of said top wall adjacent opposite sides of said opening constituting spaced apart load bearing surfaces, a strap having a body portion wrapped about said drum and end portions passing through said slots in said end walls of said bracket, said end portions presented toward each other between said side walls with a space between said end portions, a device for developing tension in said strap for securing said bracket to said drum, said device comprising a body having opposite ends with a hole having an internal right hand thread in one end and a hole having an internal left hand thread in the opposite end, hook elements having shanks on which there are, respectively, right and left hand external threads turned into mating internal threads in said body, said shanks of said hook elements terminating in hooks, respectively, for hooking onto said end portions of the strap such that turning said body causes said body to screw onto said threaded shanks to impart tension to said strap, strap support members, respectively, positioned in spaced apart relationship circumferentially of said curved lower edges of said side walls and symmetrically relative to said opening in said top wall, said strap support members spanning between said side walls and joined unitarily with said side walls, said strap support members each having a groove, into which said hooks of the hook elements register for blocking said hook elements against turning when said body of said device for developing tension is turned.

* * * * *